A. Robinson.

Roofing Apparatus.

No. 2,741. Reissued Aug. 20, 1867.

Witnesses:
Thos. Geo. Harold
Chas. R. Smith

Inventor:
Alfred Robinson

United States Patent Office.

ALFRED ROBINSON, OF NEW YORK, N. Y.

*Letters Patent No.* 48,311, *dated June* 20, 1865; *reissue No.* 2,741, *dated August* 20, 1867.

IMPROVEMENT IN THE PREPARATION OF ROOFING FABRICS.

The Schedule referred to in these Letters Patent and making part of the same.

TO ALL WHOM IT MAY CONCERN:

Be it known that I, ALFRED ROBINSON, of the city and State of New York, have invented, made, and applied to use a certain new and useful Improvement in "Preparing Roofing Fabrics;" and I do hereby declare the following to be a full, clear, and exact description of the said invention, reference being had to the annexed drawing, making part of this specification, wherein—

Similar marks of reference denote the same parts.

Figure 2:
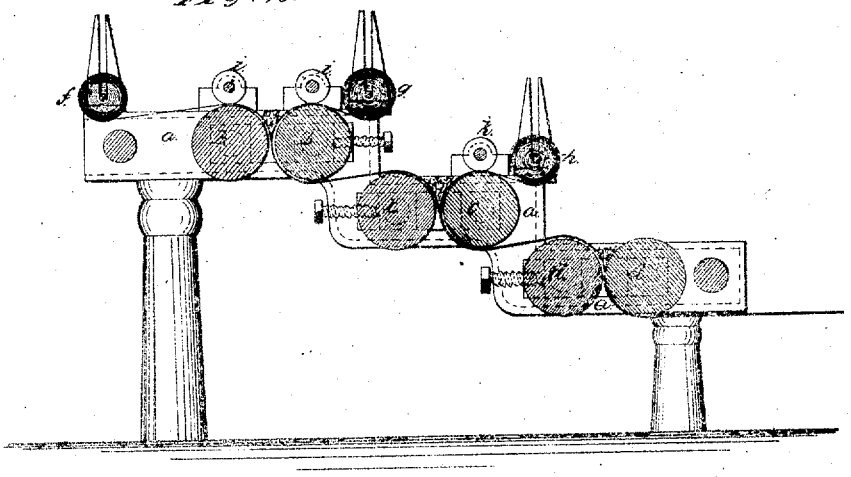
Figure 2 is a vertical longitudinal section of the same.
Figure 1:
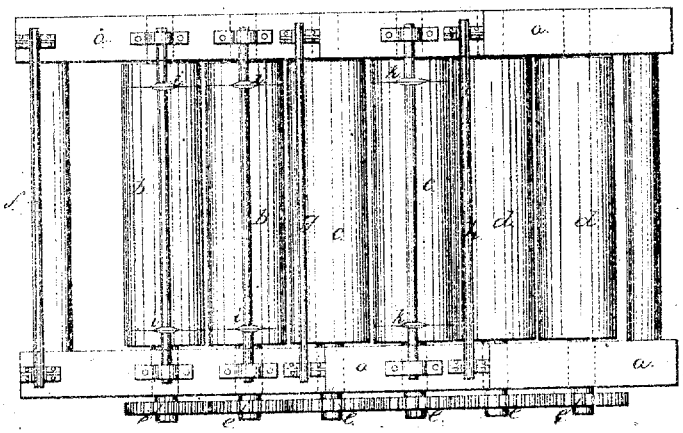
Figure 1 is a plan of the machine employed by me.

Roofing material has heretofore been prepared by passing sheets of paper or other material through melted pitch, asphalt, and similar material. Said paper or other fabric is, however, liable to be torn, and the material has to be in a very soft or fluid state, and is often unequally spread upon such fabric.

Native asphalt contains from sixty to eighty per cent. of earthy matters, and is the most durable roofing substance of this character known. Artificial asphalt or bituminous material derived from coal tar, when used alone, is liable to run in hot weather, to crack in cold weather, and rapidly wears away by exposure to the atmosphere. When this artificial asphalt is combined with a large quantity of earthy matters it forms a very durable water-proof cement.

Heretofore roofing fabrics have been coated by passing them through the bituminous composition when in a melted and very fluid condition, and it is impossible to obtain this fluid condition when any considerable amount of earthy matters is mixed in with the composition, because the earthy matters make the compound very thick and stiff, consequently it has been wholly impracticable in the processes heretofore used to coat felt and similar fabrics with the best kind of composition, that is, one composed of bitumen or similar substance combined with a large amount of earthy matters.

This composition of asphalt and earthy matters can be furnished at a much less cost than the simple bitumen or pitch, and I have devised a mode by which it can be applied to roofing fabrics.

The nature of my said invention consists in a mode of coating roofing fabric with asphalt or other material by sustaining and moving such fabric by contact with a roller on one side, while the coating material is in contact with the fabric on the other side, so that the fabric to be coated is passed between the coating material and the roller. By this means the coating material is only brought into contact with the sheet of felt or other fabrics, as the sheet itself lies against and is supported by the roller, hence there is no tendency to tear said sheet, and it does not have to be drawn through the coating material, as heretofore. I am able to add, by each pair of rollers, a sheet of felt or other material to two or more sheets previously cemented together, so as to produce a roofing fabric of any desired thickness; and by this mode of applying the coating material I am enabled to employ it in a much stiffer condition than would be possible if the paper were drawn through it, and I can also introduce, with the asphalt or other material, earthy matters that will render the roofing material much more durable, but would render the coating material too stiff for use in the manner heretofore practised.

In the drawing, *a* is a frame of suitable size, receiving the rollers *b b*, *c c*, and *d d*, each pair of which is connected by gears *e e*, and they are all to be propelled by suitable power. I have represented my apparatus as adapted to the preparation of roofing material from three rolls of paper or other fabric, *f*, *g*, and *h*, but said apparatus may have a greater or less number of rollers, so as to operate upon a less or greater number of rolls of fabric. The fabric from the rolls *f* and *g* passes under shears or rotary cutters *i i*, by which the sheets are brought to a uniform width; thence said fabric passes between the pairs of rollers *b b*. The asphalt or other cement is applied in a semi-fluid state to one side of the sheet, as aforesaid. I have shown it as applied between the rollers *b b*, and, being soft, it adheres to the sheets of paper or other fabric and causes them to stick firmly together as they pass through between the rollers *b b*, the surplus material being squeezed out and kept back. The journal-boxes of one of the rollers *b* should be adjustable, so as to allow for different thicknesses of material and for varying the thickness of the intervening layer of cement. The other pairs of rollers should also be adjustable for the same purpose. The two layers of paper or other fabric may be led between the rollers *c c*, and at this point the third layer from the roll *h* is added, a rotary cutter being provided at *k* for dressing the sheet to a uniform width, and the asphalt or other cement is applied in a soft state between the layers where they are pressed together by the rollers. A surface of asphalt or similar material may be applied to the roofing fabric prepared as aforesaid, by passing the same through the pair of rollers *d d*, at which point the coating material is applied in a soft or semi-fluid state, and is pressed or rolled upon the surface of the said roofing material. The roller with which said asphalt comes in contact should be kept greased or so prepared that the asphalt or other material will not adhere thereto.

I do not limit myself to any character of roofing paper, felt, or cloth, but intend to use this apparatus upon any desired character of fabric. The cutters *i* and *k* might act at the ends of the rollers and form, with the edges at this point, rotary shears, and the plastic asphalt or other material may be kept in its place by stationary pieces, at the ends or between the rollers, to form hoppers for retaining said material.

What I claim, and desire to secure by Letters Patent, is—

1. The method of coating a sheet or sheets of felt or other material with asphalt or other cement in a soft or plastic state, by applying such material to one side of the sheet while the other side is supported by a roller or moving surface, substantially as set forth.

2. Uniting two or more thicknesses of felt or paper to form a roofing material, by means of asphalt or other cement introduced between such thicknesses while supported and moved by a roller, substantially as set forth.

In witness whereof I have hereunto set my signature this 22d day of July, A. D. 1867.

ALFRED ROBINSON.

Witnesses:

CHAS. H. SMITH,

GEO. D. WALKER.